(12) United States Patent
Yokota et al.

(10) Patent No.: US 11,110,794 B2
(45) Date of Patent: Sep. 7, 2021

(54) VEHICLE CONTROL APPARATUS

(71) Applicant: TOYOTA JIDOSHA KABUSHIKI KAISHA, Toyota (JP)

(72) Inventors: Takahiro Yokota, Susono (JP); Mitsutaka Tanimoto, Numazu (JP); Toshihiko Seki, Susono (JP); Yoshinori Watanabe, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 16/285,890

(22) Filed: Feb. 26, 2019

(65) Prior Publication Data
US 2019/0283581 A1 Sep. 19, 2019

(30) Foreign Application Priority Data
Mar. 14, 2018 (JP) .............................. JP2018-046883

(51) Int. Cl.
| | | |
|---|---|---|
| B60K 31/00 | (2006.01) | |
| B60T 7/12 | (2006.01) | |
| B60T 8/17 | (2006.01) | |
| B61H 1/00 | (2006.01) | |

(52) U.S. Cl.
CPC ............... B60K 31/00 (2013.01); B60T 7/12 (2013.01); B60T 8/17 (2013.01); B61H 1/00 (2013.01); *B60K 2031/0091* (2013.01)

(58) Field of Classification Search
CPC ... B60K 31/00; B60K 2031/0091; B60T 7/12; B60T 8/17; B61H 1/00
USPC .......................................................... 701/93
See application file for complete search history.

(56) References Cited

U.S. PATENT DOCUMENTS

| | | | |
|---|---|---|---|
| 6,742,850 B1 | 6/2004 | Eckert et al. | |
| 2010/0256836 A1* | 10/2010 | Mudalige ............... | G08G 1/164 |
| | | | 701/2 |

FOREIGN PATENT DOCUMENTS

| | | |
|---|---|---|
| JP | 2006111084 A | 4/2006 |
| JP | 4884626 B2 | 2/2012 |

* cited by examiner

*Primary Examiner* — Gertrude Arthur Jeanglaude
(74) *Attorney, Agent, or Firm* — Sughrue Mion, PLLC (57) ABSTRACT

A vehicle control apparatus executes braking assist control to decelerate a vehicle by automatic operation of a braking device. When the vehicle control apparatus obtains a deceleration request from a driver during execution of the braking assist control, while a driver request deceleration requested to the braking device by the driver is constant or in an increasing trend, the vehicle control apparatus executes first arithmetic processing to suppress a system request deceleration requested to the braking device by the braking assist control from being decreased by the braking assist control.

9 Claims, 8 Drawing Sheets

VEHICLE CONTROL APPARATUS

CROSS-REFERENCE TO RELATED APPLICATION

This application claims priority to Japanese Patent Application No. 2018-046883, filed on Mar. 14, 2018, which is incorporated by reference herein in its entirety.

BACKGROUND

Field

The present disclosure relates to a vehicle control apparatus, particularly a vehicle control apparatus that executes braking assist control to control a vehicle deceleration automatically.

Background Art

Operation assist control that supports driver's vehicle operation by an in-vehicle system is known. Specifically, as an example of the operation assist control with low automated driving level, ACC (Adaptive Cruise Control) is known, and as an example of the operation assist control with high automated driving level, ADS (Automated Driving System) is known. The operation assist control includes driving assist control to operate a driving device automatically in order to accelerate the vehicle, braking assist control to operate a braking device automatically in order to decelerate the vehicle, and steering assist control to operate a steering device automatically in order to steer the vehicle. JP4884626B2 discloses a prior art concerning the braking assist control.

According to the prior art disclosed in JP4884626B2, a speed control unit adjusts a set vehicle speed by intervening automatically in braking control, and stops its function in the case where a braking request is output from the driver when the speed control unit is outputting a braking request. When the braking request is output from the driver, a pressure applied to a wheel braking device based on the braking request from the speed control unit is decreased in accordance with a set mathematical function.

However, the above prior art has following problems.

It is assumed that the reason why the driver outputs the braking request when the braking request from the speed control unit is being output is that the driver feels that the braking request from the speed control unit is insufficient for a vehicle deceleration. However, according to the above prior art, the pressure applied to the wheel braking device based on the braking request from the driver is combined not to an original pressure applied based on the braking request from the speed control unit but to a pressure decreased in accordance with the set mathematical function. Further, a brake pressure finally applied to the wheel braking device is adjusted to be lower than the combined brake pressure calculated as above. Even when the brake pressure is adjusted in this way, it is impossible to obtain the vehicle deceleration required by the driver. The driver feels discomfort in a difference between expected deceleration feeling and actual deceleration feeling.

SUMMARY

The present disclosure has been devised in view of such problems, and an object of the present disclosure is to provide a vehicle control apparatus that can obtain deceleration feeling expected by a driver when the driver outputs a deceleration request during execution of braking assist control.

A vehicle control apparatus according to the present disclosure is configured so that when the vehicle control apparatus obtains a deceleration request from a driver during execution of braking assist control to decelerate a vehicle by automatic operation of a braking device, while a driver request deceleration requested to the braking device by the driver is constant or in an increasing trend, the vehicle control apparatus executes first arithmetic processing to suppress a system request deceleration requested to the braking device by the braking assist control from being decreased by the braking assist control. According to the vehicle control apparatus constructed as above, while the driver request deceleration is constant or in the increasing trend, it is avoided that a change of the system request deceleration is opposed to the driver request deceleration, and the driver request deceleration is reflected to a vehicle deceleration to obtain deceleration feeling expected by the driver. Note that, in this specification, the deceleration means the negative acceleration, that the deceleration decreases means that the magnitude (or absolute value) of the deceleration decreases, that the deceleration increases means that the magnitude of the deceleration increases.

The vehicle control apparatus may calculates the system request deceleration based on a target acceleration in the braking assist control. In the first arithmetic processing in this case, when updating the target acceleration, the vehicle control apparatus may permit only updating to a side that increases a vehicle deceleration. By updating the target acceleration only to the side that increases the vehicle deceleration, the system request deceleration calculated based on the target acceleration is suppressed from changing to a decreasing side.

When calculating the system request deceleration based on the target acceleration in the braking assist control, the vehicle control apparatus may determine the target acceleration from an acceleration feedforward term that is a planned acceleration and a speed feedback term calculated based on a difference between a planned speed and an actual speed. In the first arithmetic processing in this case, when updating the acceleration feedforward term, the vehicle control apparatus may permit only updating to a side that increases the vehicle deceleration. By updating the acceleration feedforward term only to the side that increases the vehicle deceleration, the system request deceleration determined from the acceleration feedforward term and the speed feedback term is suppressed from changing to the decreasing side.

Also, in the first arithmetic processing in the above case, the vehicle control apparatus may hold a value of the speed feedback term. By holding the value of the speed feedback term, the system request deceleration calculated based on the target acceleration determined from the acceleration feedforward term and the speed feedback term is suppressed from changing to the decreasing side. Further, in the first arithmetic processing, the vehicle control apparatus may update the planned speed so as to make the planned speed coincide with the actual speed. This gives the continuity to the speed feedback term before and after the end of the deceleration request from the driver, and thereby, an abrupt change of the vehicle deceleration that occurs with the end of the deceleration request from the driver is suppressed.

In the braking assist control, the vehicle control apparatus may calculate an acceleration feedback term from a difference between a target acceleration and an actual acceleration by using integral control, and may calculate the system request deceleration based on an acceleration obtained by summing the target acceleration and the acceleration feedback term. In the first arithmetic processing in this case, the vehicle control apparatus may update the acceleration feedback term if the acceleration feedback term is updated to a side that increases a vehicle deceleration, and may hold a previous value of the acceleration feedback term without updating the acceleration feedback term if the acceleration feedback term isn't updated to the side that increases the vehicle deceleration. Thereby, the difference between the target acceleration and the actual acceleration is fed back to the system request deceleration only when the actual acceleration is excessive for the target acceleration, so that the system request deceleration is suppressed from changing to the decreasing side.

Further, the vehicle control apparatus may be configured so that when the driver request deceleration decreases during the execution of the braking assist control, the vehicle control apparatus execute second arithmetic processing to decrease the system request deceleration in accordance with a decreasing degree of the driver request deceleration. In the case where the driver request deceleration decreases, by decreasing the system request deceleration in accordance with the decreasing degree of the driver request deceleration, deceleration feeling expected by the driver is obtained even when the driver is trying to decrease the deceleration of the vehicle.

In the braking assist control, the vehicle control apparatus may calculate the system request deceleration based on a target acceleration. In the second arithmetic processing in this case, the vehicle control apparatus may change the target acceleration to a side that decreases the system request deceleration in accordance with the decreasing degree of the driver request deceleration. Thereby, the decrease of the system request deceleration in accordance with the decreasing degree of the driver request deceleration is realized through a setting of the target acceleration.

In the second arithmetic processing in the case where the system request deceleration is calculated based on the target acceleration, which is determined from the acceleration feedforward term and the speed feedback term, the vehicle control apparatus may change the acceleration feedforward term to a side that decreases the system request deceleration in accordance with the decreasing degree of the driver request deceleration while holding a value of the speed feedback term. By changing the acceleration feedforward term while fixing the speed feedback term that changes in accordance with the difference between the planned speed and the actual speed, the system request deceleration is decreased in accordance with the decreasing degree of the driver request deceleration.

As described above, according to the vehicle control apparatus according to the present disclosure, while the driver request deceleration is constant or in the increasing trend, it is avoided that the change of the system request deceleration is opposed to the driver request deceleration, and the driver request deceleration is reflected to the vehicle deceleration to obtain the deceleration feeling expected by the driver.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures and steps that are described in the embodiments shown as follows are not always indispensable to the disclosure unless specially explicitly shown otherwise, or unless the disclosure is explicitly specified by the structures or the steps theoretically.

1. First Embodiment 1-1. Configuration of Vehicle Control Apparatus According to First Embodiment The present disclosure is applicable to, for example, a vehicle control apparatus that executes braking assist control of which the automated driving level is level 1 or higher in SAE (Society of Automotive Engineers) level definition. For example, ADS and ACC correspond to the braking assist control of which the automated driving level is level 1 or higher. The vehicle control apparatus according to the present embodiment is configured as a vehicle control apparatus equipped with ADS.

Figure 1:
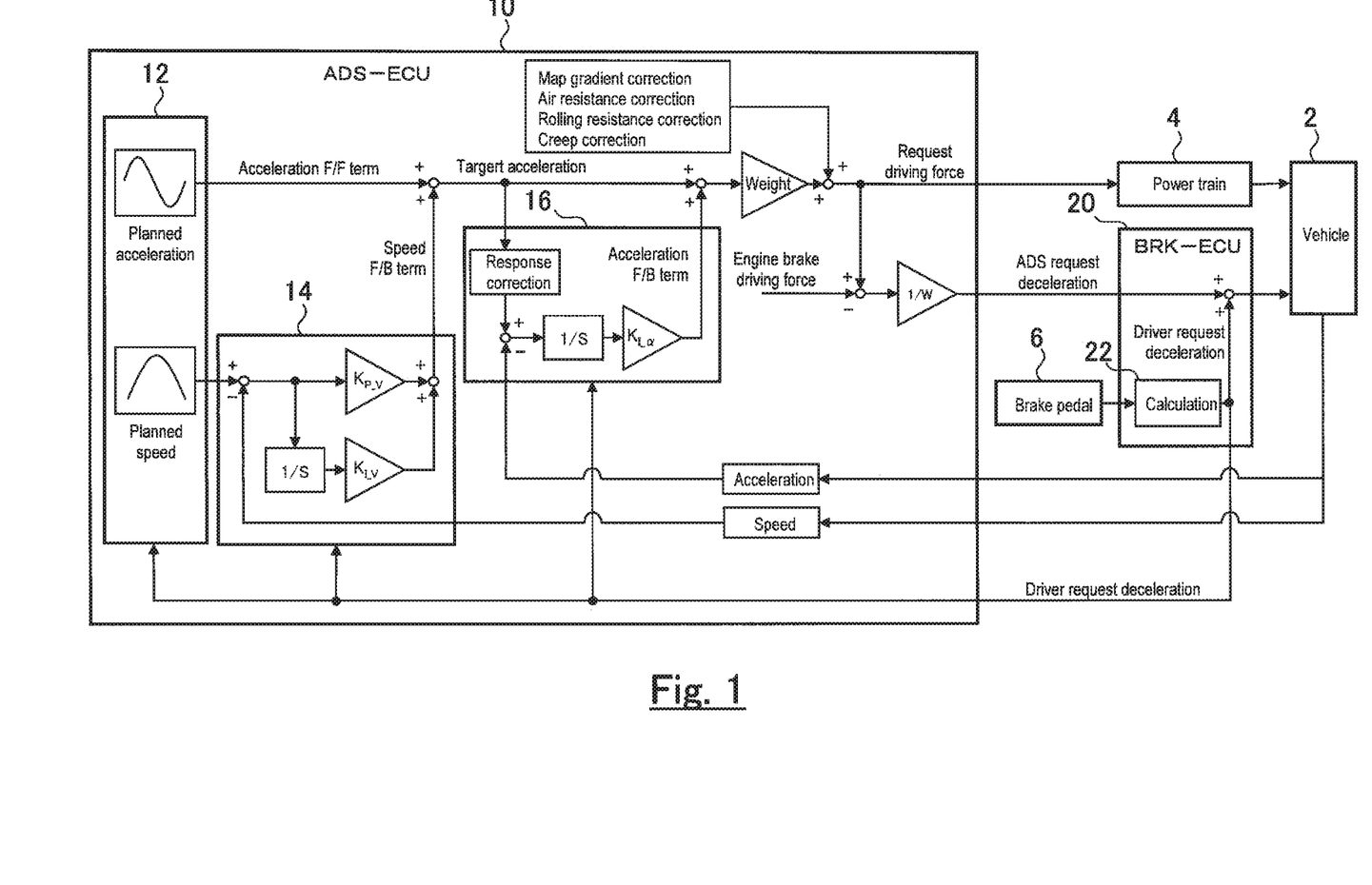
FIG. 1 is a control block diagram of a vehicle control apparatus according to a first embodiment of the present disclosure.

FIG. 1 is a control block diagram of the vehicle control apparatus according to the present embodiment. The vehicle control apparatus according to the present embodiment consists of at least two ECUs (Electronic Control Unit) 10, 20. One ECU is an ADS-ECU 10 to function as an ADS and the other ECU is a BRK-ECU 20 to operate a braking device. The vehicle 2 is equipped with a plurality of ECUs other than these ECUs 10, 20, but explanations about other ECUs are omitted.

The ADS-ECU 10 comprises a planner 12. The planner 12 calculates a planned acceleration and planned speed for causing the vehicle 2 travel along a set traveling route, over a predetermined period from the current time to the future, and updates them in a fixed cycle. The calculation of the planned acceleration and planned speed is executed for the purpose of keeping the distance between the vehicle 2 and a preceding vehicle, adjusting the speed of the vehicle 2 so as not to exceed a set speed, and adjusting the speed of the vehicle 2 so as to keep the lateral acceleration of the vehicle 2 below a specified value. Note that the vehicle 2 is equipped with a radar (not shown) for inter-vehicle distance control.

The ADS-ECU 10 calculates a target acceleration consisting of an acceleration feedforward term and a speed feedback term. The planned acceleration calculated by the planner 12 is used as the acceleration feedforward term (hereafter, referred as acceleration F/F term) of the target acceleration. The speed feedback term (hereafter, referred as speed F/B term) is a feedback term to make the actual speed of the vehicle 2 coincide with the planned speed. The calculation of the speed F/B term is executed by a speed F/B term arithmetic unit 14 of the ADS-ECU 10. The speed F/B term arithmetic unit 14 calculates the difference between the planned speed and the actual speed obtained from the vehicle 2, and calculates the speed F/B term by applying proportional integral control to the difference.

The ADS-ECU 10 adds to the target acceleration an acceleration feedback term to make the actual acceleration of the vehicle 2 coincide with the target acceleration. The acceleration feedback term (hereafter, referred as acceleration F/B term) is calculated by an acceleration F/B term arithmetic unit 16 of the ADS-ECU 10. The acceleration F/B term arithmetic unit 16 executes a response correction to the target acceleration by a response delay of the vehicle 2 to a braking operation or driving operation, calculates the difference between the response corrected target acceleration and the actual acceleration obtained from the vehicle 2, and calculates the acceleration F/B term by applying integral control to the difference.

The ADS-ECU 10 calculates a request driving force based on a corrected target acceleration obtained by adding the acceleration F/B term to the target acceleration. Specifically, first, the corrected target acceleration is converted to a driving force by multiplying the corrected target acceleration by the weight of the vehicle 2. Next, a driving force correction term for various corrections such as a map gradient correction, an air resistance correction, a rolling resistance correction, and a creep correction is calculated, and the request driving force is calculated by adding the driving force correction term to the driving force converted from the corrected target acceleration.

The request driving force calculated by the ADS-ECU 10 is provided from the ADS-ECU 10 to a power train 4. The power train 4 generates a driving force in accordance with the request driving force, and accelerates the vehicle 2 by the driving force. However, when the request driving force is smaller than an engine brake driving force, the request driving force is not output from the ADS-ECU 10 or treated as an invalid value at the power train 4. Note that the type of the power train 4 is not limited. The power train 4 may be an engine system including an internal combustion engine and a transmission, a fuel cell system, or an EV system. The power train 4 may be a hybrid system having an internal combustion engine and a motor generator as driving devices.

The request driving force is also used for a calculation of an ADS request deceleration in the ADS-ECU 10. First, the ADS-ECU 10 obtains a corrected request driving force by subtracting a driving force obtained by an engine brake from the request driving force. Next, the ADS-ECU 10 calculates the ADS request deceleration by multiplying the inverse of the weight of the vehicle 2 to the corrected request driving force. The ADS request deceleration is a deceleration that the ADS-ECU 10 requests to the braking device, that is, a system request deceleration. By the ADS request deceleration being given to the BRK-ECU 20 from the ADS-ECU 10, the braking assist control to decelerate the vehicle 2 by automatic operation of the braking device is executed. However, the "deceleration" is a synonym for the "acceleration" of which the sign is negative, so its value is less than or equal to zero. Therefore, when the value of the ADS request deceleration is positive, the ADS request deceleration is not output from the ADS-ECU 10 or treated as an invalid value in the BRK-ECU 20.

The BRK-ECU 20 comprises a driver request deceleration arithmetic unit 22. The driver request deceleration arithmetic unit 22 obtains driver's operation of a brake pedal 6 as a deceleration request from the driver. The amount of the operation of the brake pedal 6 is concretely a brake master pressure or a brake stroke amount. Also, the driver request deceleration arithmetic unit 22 calculates a deceleration requested from the driver to the braking device, that is, a driver request deceleration, from the amount of the operation of the brake pedal 6 by the driver. The relation between the amount of the operation of the brake pedal 6 and the driver request deceleration can be set arbitrarily.

The BRK-ECU 20 calculates a combined request deceleration by adding the driver request deceleration to the ADS request deceleration. The combined request deceleration is provided from the BRK-ECU 20 to the braking device of the vehicle 2. The braking device generates a braking force in accordance with the combined request deceleration, and decelerates the vehicle 2 by the braking force. Note that the braking device is, for example, a hydraulic braking device and/or power regeneration braking device.

The driver request deceleration calculated by the driver request deceleration arithmetic unit 22 is provided from the BRK-ECU 20 to the ADS-ECU 10. The driver request deceleration provided to the ADS-ECU 10 is used as a condition to switch a calculation method in each of the planner 12, the speed F/B term arithmetic unit 14 and the acceleration F/B term arithmetic unit 16. This will be described later.

Figure 2:
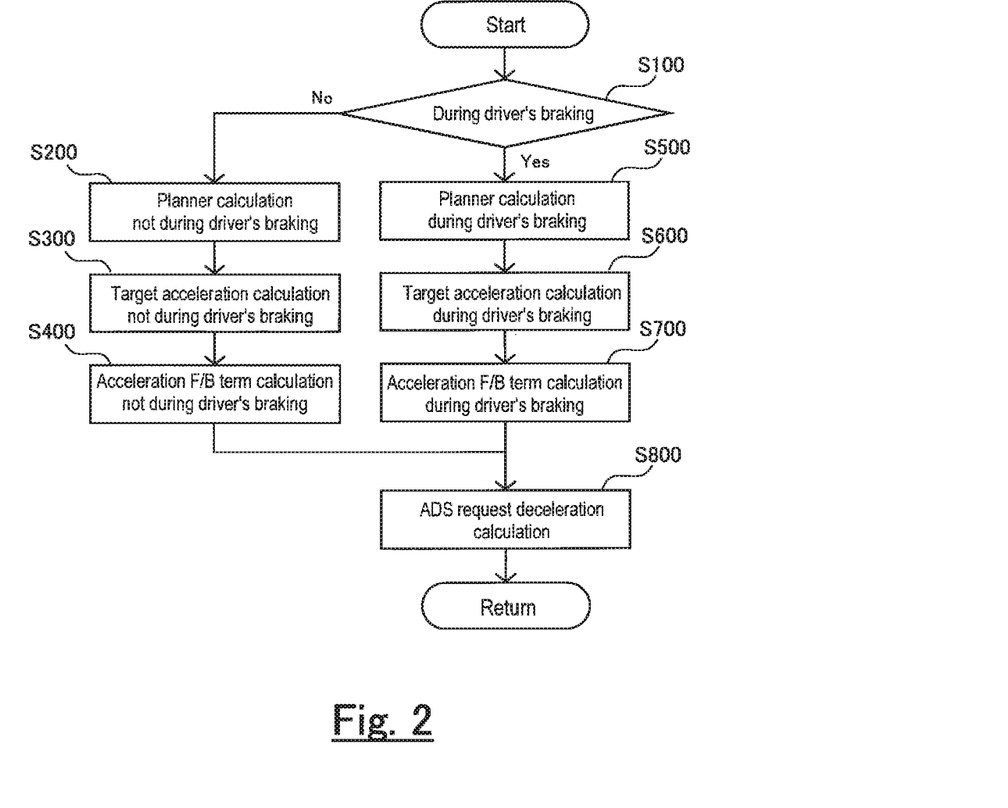
FIG. 2 is a flowchart showing a control flow in operation of an ADS for the vehicle control apparatus according to the first embodiment of the present disclosure.

1-2. Characteristic Function of Vehicle Control Apparatus According to First Embodiment FIG. 2 is a flowchart showing a control flow in operation of the ADS for the vehicle control apparatus according to the present embodiment. During the operation of the ADS, the braking assist control is executed by the ADS-ECU 10. When the vehicle control apparatus obtains the deceleration request from the driver during the execution of the braking assist control by the ADS-ECU 10, while the driver request deceleration is constant or in the increasing trend, the vehicle control apparatus executes first arithmetic processing to suppress the system request deceleration from being decreased by the braking assist control by the ADS-ECU 10. Hereafter, the characteristic function of the vehicle control apparatus according to the present embodiment, especially, the first arithmetic processing will be described with reference to this flowchart.

In step S100, the ADS-ECU 10 determines whether braking by the driver is being performed or not. This determination is performed by using a value of the driver request deceleration provided from the BRK-ECU 20 to the ADS-ECU 10. Or, this determination may be performed based on the presence or absence of the deceleration request from the driver. Note that, in the present embodiment, a square wave signal of which the height represents the value of the driver request deceleration is output from the driver request deceleration arithmetic unit 22.

When braking by the driver is not being performed, the ADS-ECU 10 executes processing in step S200, step S300 and step S400. In step S200, the calculation of the planned acceleration and planned speed is executed by the planner 12. In step S300, the target acceleration is calculated by summing the acceleration F/F term obtained from the planned acceleration calculated in step S200 and the speed F/B term calculated from the difference between the planned speed and the actual speed by the speed F/B term arithmetic unit 14. In step S400, the acceleration F/B term to make the actual acceleration coincide with the target acceleration calculated in step S300 is calculated by the acceleration F/B term arithmetic unit 16. The processing in these steps is normal processing executed when the ADS is operated.

When braking by the driver is being performed, the ADS-ECU 10 executes processing in step S500, step S600 and step S700. The processing in these steps is the previously mentioned "first arithmetic processing" which is different from the normal processing executed when the ADS is operated. Hereafter, the contents of the processing in step S500, step S600 and step S700 will be described with reference to the drawings.

In step S500, when the current control of the ADS is the driving assist control to accelerate the vehicle 2, the ADS-ECU 10 terminates the driving assist control. When the current control of the ADS is the braking assist control, the ADS-ECU 10 continues the braking assist control. However, the planner 12 updates the planned acceleration only to the side that increases a vehicle deceleration when calculating the planned acceleration for the braking assist control. Note that, as will be explained repeatedly, to increase the deceleration means to increase the magnitude (that is, the absolute value) of the deceleration.

Figure 3:
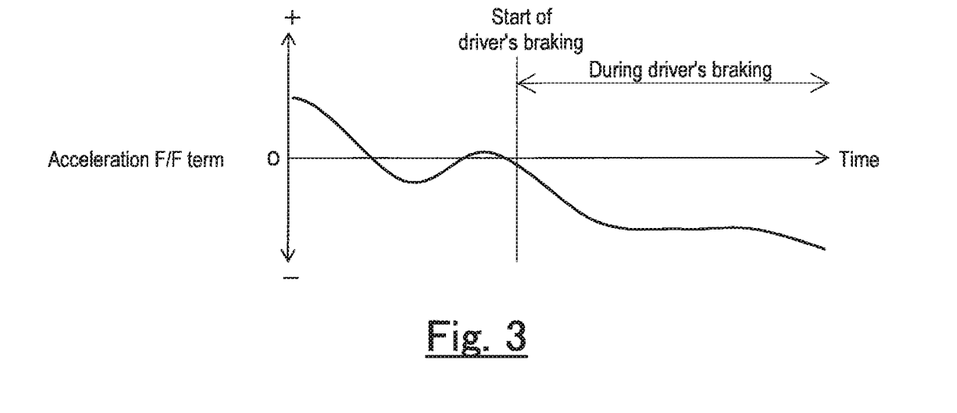
FIG. 3 is a diagram illustrating processing to an acceleration F/F term on which a ADS request deceleration is based.

The planned acceleration calculated in the planner 12 is output as the acceleration F/F term constituting the target acceleration. FIG. 3 shows an example of time-series data of the acceleration F/F term during the execution of the braking assist control. Before the start of braking by the driver, the acceleration F/F term has changed to both the plus side and the minus side. However, during braking by the driver, the acceleration F/F term is allowed to change only to the minus side. By updating the acceleration F/F term only to the side that increases the vehicle deceleration, the ADS request deceleration that is calculated based on the target acceleration is suppressed from changing to the decreasing side.

Also, the planner 12 calculates the planned speed based on the planned acceleration by using the actual speed of the vehicle 2 as a reference point. That is, the planner 12 updates the planned speed to make the current value of the planned speed correspond to the actual speed. This processing is executed in relation to the processing in step S600.

In step S600, the value of the speed F/B term at the time of the start of braking by the driver is held by the speed F/B term arithmetic unit 14. Then, the target acceleration is calculated by summing the acceleration F/F term calculated in step S500 and the speed F/B term held by the speed F/B term arithmetic unit 14.

Figure 4:
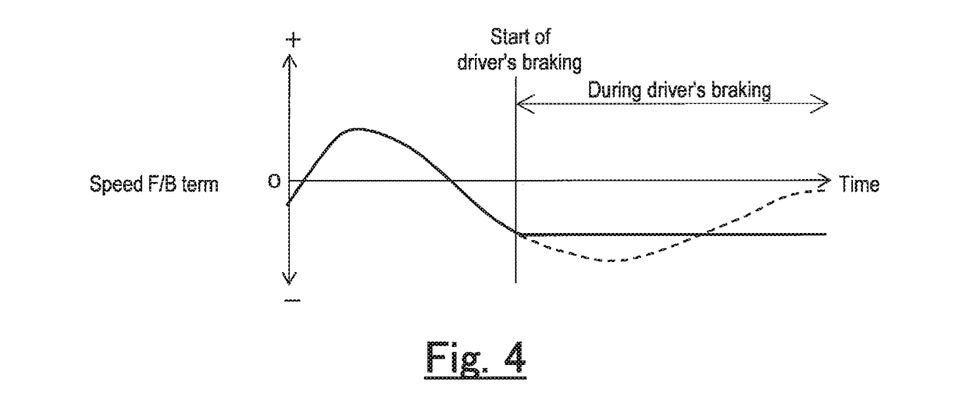
FIG. 4 is a diagram illustrating processing to a speed F/B term on which the ADS request deceleration is based.

FIG. 4 shows an example of time-series data of the speed F/B term during the execution of the braking assist control. Before the start of braking by the driver, the value of the speed F/B term has varied with time. When the normal calculation of the speed F/B term is executed continuously after the start of braking by the driver, the value of the speed F/B term can vary with time as indicated by a broken line in the figure. However, according to the processing in step S600, the speed F/B term is held at a fixed value during the execution of braking by the driver. By holding the value of the speed F/B term constituting the target acceleration at the fixed value, the ADS request deceleration that is calculated based on the target acceleration is suppressed from changing to the decreasing side.

In addition, if the value of the speed F/B term is fixed simply, the speed F/B term may change discontinuously due to the expansion of the difference between the actual speed and the planned speed at the time of returning to the normal processing, and thereby the vehicle deceleration may change abruptly. In this regard, the ADS-ECU 10 executes processing to adjust the planned speed to the actual speed in step S500. As a result, continuity can be given to the speed F/B term before and after the end of braking by the driver, and thereby the vehicle deceleration is suppressed from changing abruptly with the end of braking by the driver.

In step S700, the ADS-ECU 10 calculates the acceleration F/B term to make the actual acceleration coincide with the target acceleration calculated in step S600 by the acceleration F/B term arithmetic unit 16. The acceleration F/B term arithmetic unit 16 calculates the current value of the acceleration F/B term by using the integral control based on the difference between the target acceleration and the actual acceleration. However, in step S700, the acceleration F/B term is updated only to the side that increases the vehicle deceleration. That is, the acceleration F/B term is updated only when the current value of the acceleration F/B term shifts to the minus side than the previous value. When the current value of the acceleration F/B term doesn't shift to the minus side than the previous value, the acceleration F/B term isn't updated and the previous value thereof is held.

Figure 5:
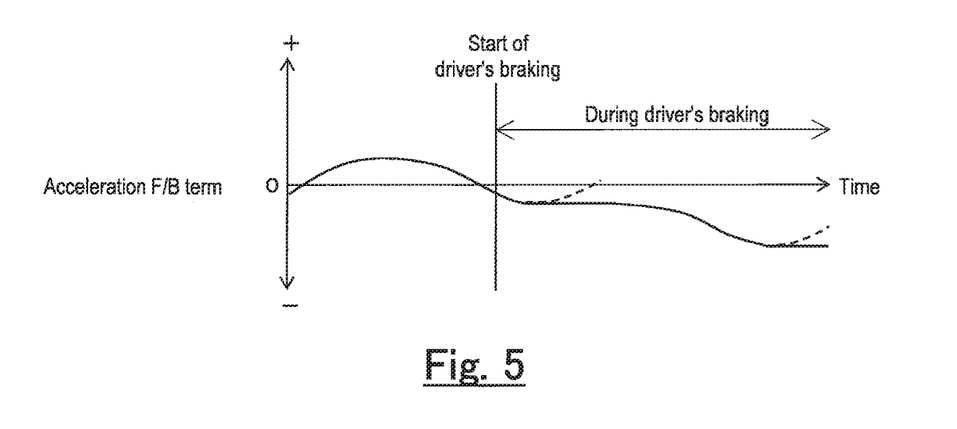
FIG. 5 is a diagram illustrating processing to an acceleration F/B term on which the ADS request deceleration is based.

FIG. 5 shows an example of time-series data of the acceleration F/B term during the execution of the braking assist control. Before the start of braking by the driver, the acceleration F/B term has changed to both the plus side and the minus side with time. However, during braking by the driver, the acceleration F/B term is allowed to change only to the side that increases the vehicle deceleration. Thus, even if the acceleration F/B term changes as indicated by broken lines in the figure in the case of the normal calculation of the acceleration F/B term, such the change isn't allowed and the previous value of the acceleration F/B term is held. According to the processing as this, only when the actual acceleration deviates to the plus side with respect to the target acceleration, that is, only when the actual deceleration is short with respect to the target deceleration, the difference between the target acceleration and the actual acceleration is fed back to the ADS request deceleration, and thereby the ADS request deceleration is suppressed from changing to the decreasing side.

After the processing in step S200, step S300 and step S400, processing in step S800 is executed. Also after the processing in step S500, step S600 and step S700, the processing in step S800 is executed. In step S800, the ADS-ECU 10 calculates the request driving force based on the corrected target acceleration obtained by adding the acceleration F/B term calculated in step S400 to the target acceleration calculated in step S300, or based on the corrected target acceleration obtained by adding the acceleration F/B term calculated in step S700 to the target acceleration calculated in step S600, and calculates the ADS request deceleration from the request driving force.

1-3. Effect of Vehicle Control Apparatus According to First Embodiment

Figure 6:
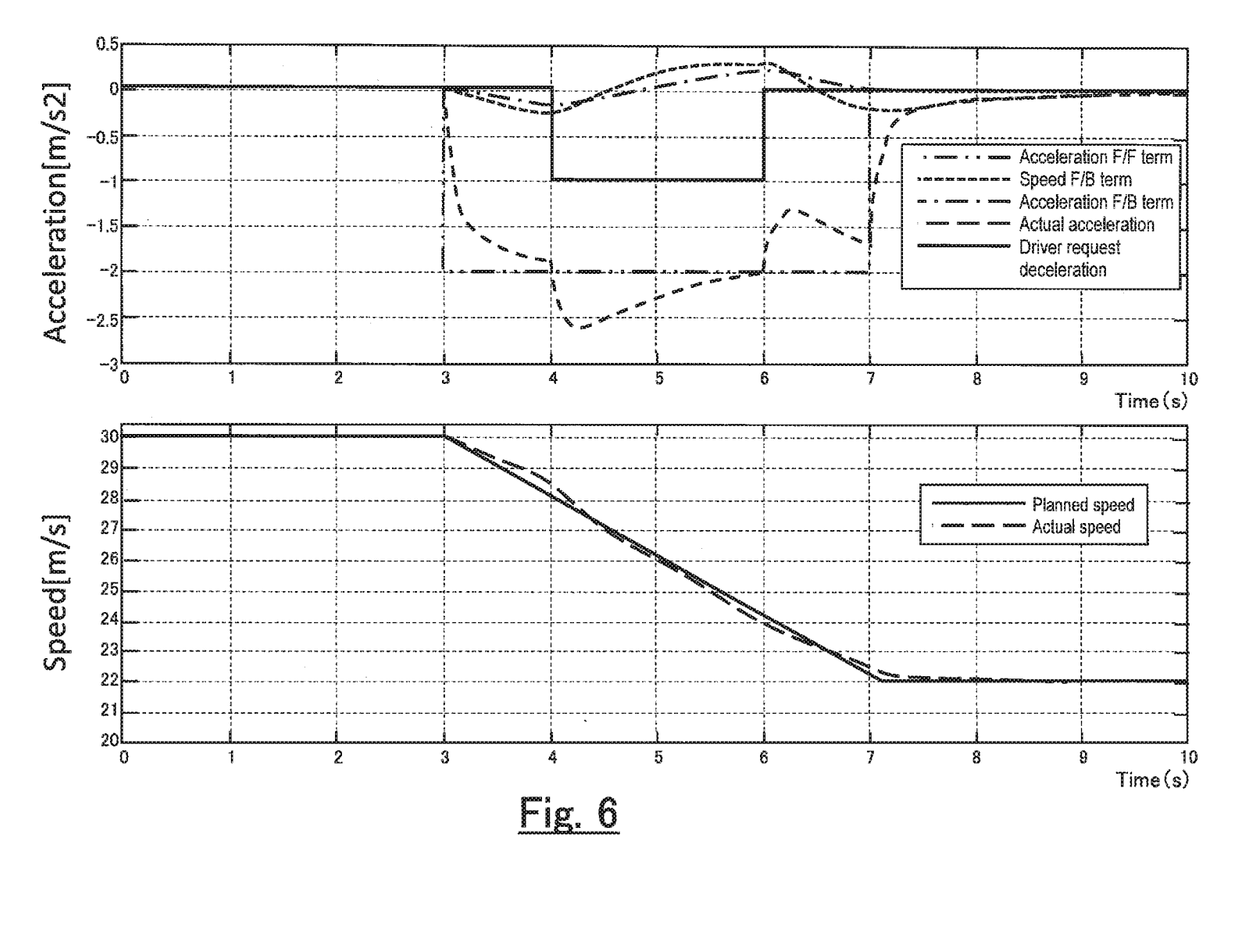
FIG. 6 is a diagram showing time-series data of braking assist control by a vehicle control apparatus as a comparative example.
Figure 7:
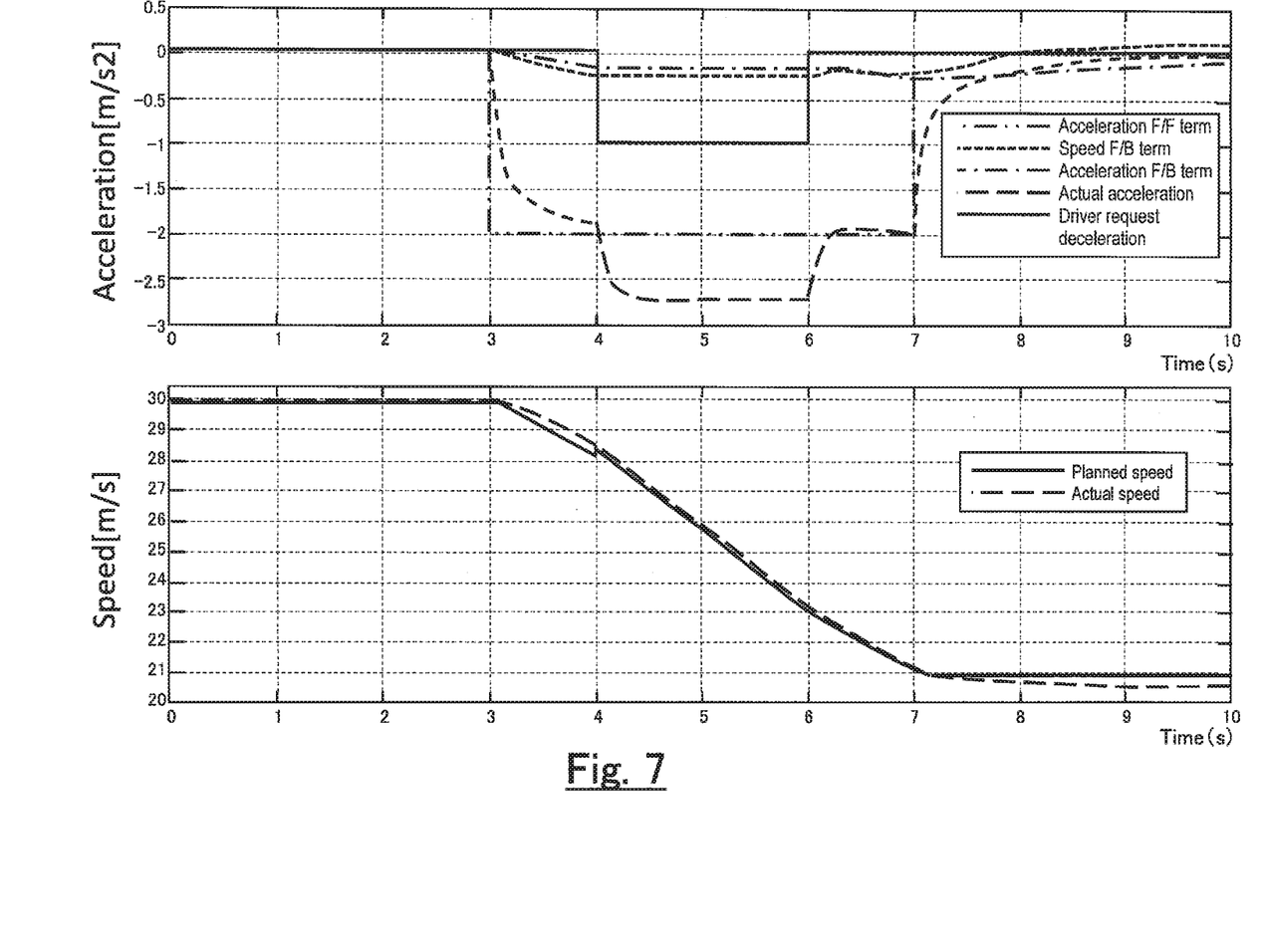
FIG. 7 is a diagram showing time-series data of braking assist control by the vehicle control apparatus according to the first embodiment of the present disclosure.

FIG. 6 is a diagram showing time-series data of braking assist control by a vehicle control apparatus as a comparative example with respect to the present embodiment. On the other hand, FIG. 7 is a diagram showing time-series data of the braking assist control by the vehicle control apparatus according to the present embodiment. Both FIG. 6 and FIG. 7 show time-series data concerning acceleration in the upper chart, and show time-series data concerning speed in the lower chart. In the upper chart, the two-dot chain line shows the acceleration F/F term (planned acceleration), the dotted line shows the speed F/B term, the one-dot chain line shows the acceleration F/B term, the broken line shows the actual acceleration, and the solid line shows the driver request deceleration. In the lower chart, the solid line shows the planned speed, and the broken line shows the actual speed.

The vehicle control apparatus according to the present embodiment executes the processing in accordance with the control flow shown in FIG. 2. On the other hand, the vehicle control apparatus of the comparative example executes the processing in step S200, step S300 and step S400 irrespective of whether braking by the driver is performed or not in the control flow shown in FIG. 2. That is, the vehicle control apparatus of the comparative example doesn't execute the above mentioned "first arithmetic processing" during the execution of the braking assist control. Hereafter, the effect of the vehicle control apparatus according to the present embodiment will be made clear by comparing FIG. 6 and FIG. 7.

In FIG. 6 and FIG. 7, both the comparative example and the present embodiment execute the braking assist control from the time 3 seconds to the time 7 seconds. In the braking assist control, the acceleration F/F term is output with a square wave signal. Braking by the driver is performed from the time 4 seconds to the time 6 seconds after the start of the braking assist control, and the driver request deceleration is output with a square wave signal. Thus, driver request deceleration is constant from the start of braking by the driver to the end thereof.

According to the vehicle control apparatus of the comparative example, each of the speed F/B term and the acceleration F/B term changes to the plus side immediately after the signal of the driver request deceleration rises to the minus side as shown in FIG. 6. The change of the speed F/B term to the plus side is an action to compensate for the deviation between the planned speed and the actual speed that decreased by output of the driver request deceleration. The change of the acceleration F/B term to the plus side is an action to compensate for the deviation between the target acceleration and the actual acceleration that decreased by output of the driver request deceleration. By the speed F/B term and acceleration F/B term changing as this, the actual acceleration that once changed to the minus side returns to the plus side gradually to converge to the acceleration F/F term. Consequently, the vehicle deceleration increases temporarily with the output of the driver request deceleration, but gradually decreases without its magnitude being held. In this way, the vehicle deceleration decreases even though the driver request deceleration is output, and thereby the driver feels uncomfortable as if the braking force is missing.

Further, when the signal of the driver request deceleration returns to the zero level, both the speed F/B term and the acceleration F/B term has changed to the plus side more than at the start of braking by the driver, so the actual acceleration increases to overshoot the acceleration F/F term. In other words, the deviation of the actual acceleration to the minus side decreases than the acceleration F/F term. As a result, the vehicle deceleration decreases greater than the driver intends. This makes the driver feel uncomfortable further.

On the other hand, according to the vehicle control apparatus of the present embodiment, from the time point when the signal of the driver request deceleration rises to the minus side until the signal returns to zero again, the value of the speed F/B is held at the value at the time point when the signal of the driver request deceleration rose to the minus side as shown in FIG. 7. This is because the processing in step S600 in the control flow shown in FIG. 2 is executed. Also, from the time point when the signal of the driver request deceleration rises to the minus side until the signal returns to zero again, the acceleration F/B term doesn't change to the plus side. This is because the processing in step S700 in the control flow shown in FIG. 2 is executed. In this way, by both the speed F/B term and the acceleration F/B term being suppressed from changing to the plus side, the actual acceleration changes to the minus side by the magnitude of the driver request deceleration with reference to the acceleration F/F term. Consequently, according to the vehicle control apparatus of the present embodiment, because the vehicle deceleration to which the deceleration request from the driver is reflected is obtained, the driver can get deceleration feeling as expected.

Further, according to the vehicle control apparatus according to the present embodiment, irrespective of the speed F/B term being fixed, the speed F/B term continues before and after the signal of the driver request deceleration returns to the zero level. This is because the processing in step S500 in the control flow shown in FIG. 2 is executed and the planned speed while the speed F/B term is fixed is adjusted to the actual speed. By continuing the speed F/B term before and after the end of braking by the driver, the vehicle deceleration is suppressed from changing abruptly with the end of braking by the driver.

2. Second Embodiment

2-1. Configuration of Vehicle Control Apparatus According to Second Embodiment The configuration of the vehicle control apparatus according to the present embodiment is the same as that of the first embodiment illustrated by the control block diagram in FIG. 1. Thus, a description of the configuration of the vehicle control apparatus will be omitted.

Figure 8:
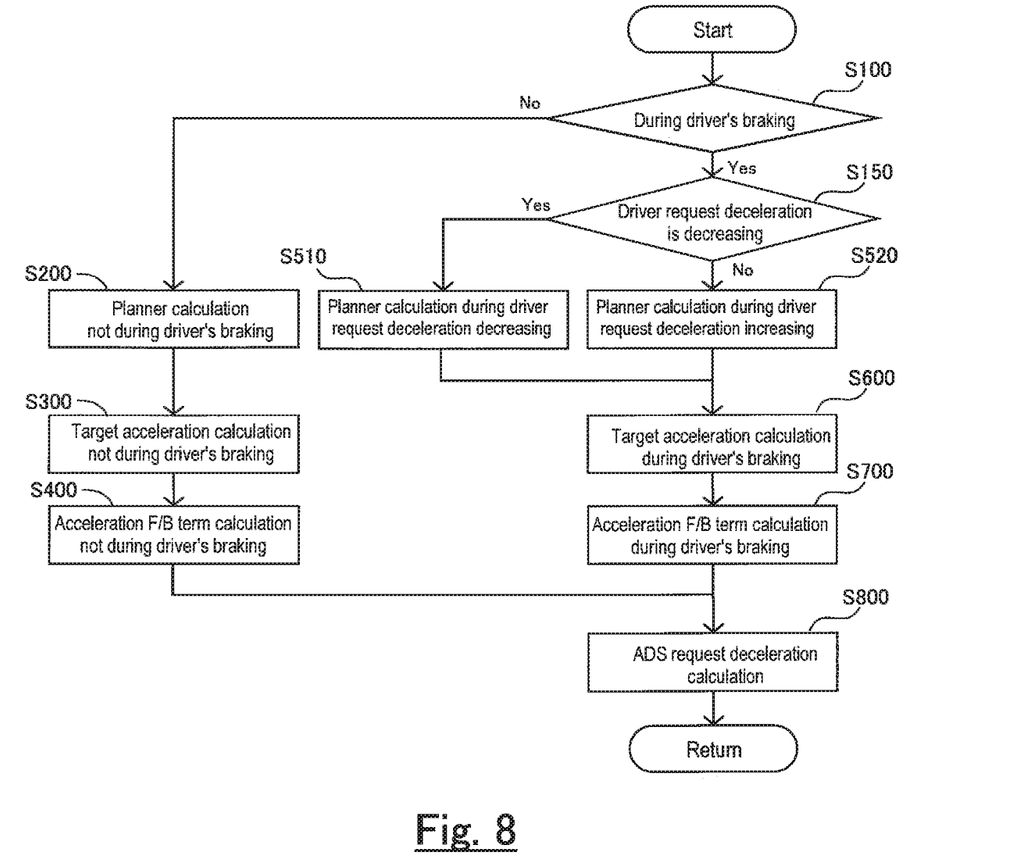
FIG. 8 is a flowchart showing a control flow in operation of an ADS for a vehicle control apparatus according to a second embodiment of the present disclosure.

2-2. Characteristic Function of Vehicle Control Apparatus According to Second Embodiment FIG. 8 is a flowchart showing a control flow in operation of the ADS for the vehicle control apparatus according to the present embodiment. When the vehicle control apparatus obtains the deceleration request from the driver during the execution of the braking assist control by the ADS-ECU 10, while the driver request deceleration is constant or in the increasing trend, the vehicle control apparatus executes the aforementioned first arithmetic processing. Further, when the driver request deceleration decreases during the execution of the braking assist control, the vehicle control apparatus executes second arithmetic processing to decrease the ADS request deceleration in accordance with the decreasing degree of the driver request deceleration.

In the control flow shown in FIG. 8, the processing having the same contents as the processing shown in the control flow in FIG. 2 is given the same step number. In the present embodiment, processing in step S520, step S600 and step S700 executed during the execution of braking by the driver is the aforementioned "first arithmetic processing" that is executed when the ADS is operated, and processing in step S510 is the aforementioned "second arithmetic processing" that is executed when the ADS is operated. Hereafter, the characteristic function of the vehicle control apparatus according to the present embodiment will be described with a focus on processing in step S150, step S510 and step 520, which is the difference from the control flow shown in FIG. 2.

The driver request deceleration arithmetic unit 22 according to the first embodiment outputs a square wave signal of which the height represents the value of the driver request deceleration is output from. On the other hand, the driver request deceleration arithmetic unit 22 according to the second embodiment outputs a signal of which the value changes continuously in accordance with the operating amount of the brake pedal 6 by the driver. Therefore, although the driver request deceleration in the first embodiment is constant from the start to the end of braking by the driver, the driver request deceleration in the present embodiment increases by the brake pedal 6 being depressed by the driver and decreases by the brake pedal 6 being returned by the driver.

In the present embodiment, when it is determined that braking by the driver is performed in step S100, determination in step S150 is performed. In step S150, the ADS-ECU 10 determines whether the driver request deceleration is decreasing or not. Whether the driver request deceleration is decreasing or not can be determined from the slope of the driver request deceleration, which is calculated by differential processing by a filter. Also, if the magnitude of the driver request deceleration at the ending point of a fixed period is smaller than that at the starting point of the fixed period, it may be determined that the driver request deceleration is decreasing. In this case, even if the driver request deceleration microscopically increases or decreases within the fixed period due to the influence of noise for example, if the driver request deceleration is decreasing as the whole period, it can be determined that the driver request deceleration is decreasing.

When the determination result of step S150 is affirmative, that is, the driver request deceleration is decreasing, the ADS-ECU 10 executes processing in step S510. In step S510, when the current ADS control is the braking assist control, the planner 12 changes the planned acceleration to the side that decreases the ADS request deceleration in accordance with the decreasing degree of the driver request deceleration when calculating the planned acceleration for the braking assist control. In other words, when the driver request deceleration is decreasing quickly, the planner 12 changes the planned acceleration to the plus side with high speed, and when the driver request deceleration is decreasing slowly, the planner 12 changes the planned acceleration to the plus side with low speed. Also, the planner 12 calculates the planned speed based on the planned acceleration with reference to the actual speed of the vehicle 2 when calculating the planned speed for the braking assist control.

The planned acceleration calculated by the planner 12 is output as the acceleration F/F term constituting the target acceleration. By changing the acceleration F/F term to the plus side in accordance with the decreasing degree of the driver request deceleration, the ADS request deceleration calculated based on the target acceleration decreases in accordance with the decreasing degree of the driver request deceleration. Consequently, the driver can get deceleration feeling as expected from the return operation even when the brake pedal 6 is operated to the returning direction.

However, when the planner 12 determines that the ADS request deceleration cannot be decreased, the processing to change the planned acceleration to the side that decreases the ADS request deceleration is not performed. For example, when a pre-crash safety system (PCS) is in operation, realizing the deceleration requested by the pre-crash safety system is prioritized.

When the determination result of step S150 is negative, that is, the driver request deceleration is not decreasing, the ADS-ECU 10 executes processing in step S520. That the driver request deceleration is not decreasing means that the driver request deceleration is constant or in the increasing trend. The processing in step S520 is the same as the processing in step S500 shown in FIG. 2. In other words, when the current ADS control is the braking assist control, the planner 12 updates the planned acceleration only to the side that increases the vehicle deceleration when calculating the planned acceleration for the braking assist control, and calculates the planned speed based on the planned acceleration with reference to the actual speed of the vehicle 2 when calculating the planned speed for the braking assist control.

After the processing in step S510 and step S520, the ADS-ECU 10 executes the processing in step S600 and step S700. In step S600, the value of the speed F/B term at the time point when braking by the driver is started is held by the speed F/B term arithmetic unit 14. Then, the target acceleration is calculated by summing the acceleration F/F term calculated by the step S510 and the speed F/B term held by the arithmetic unit 14. In step S700, the acceleration F/B term to make the actual acceleration coincide with the target acceleration is calculated by the acceleration F/B term arithmetic unit 16. However, as described above, the acceleration F/B term is updated only to the side that increases the vehicle deceleration.

2-3. Effect of Vehicle Control Apparatus According to Second Embodiment

Figure 9:
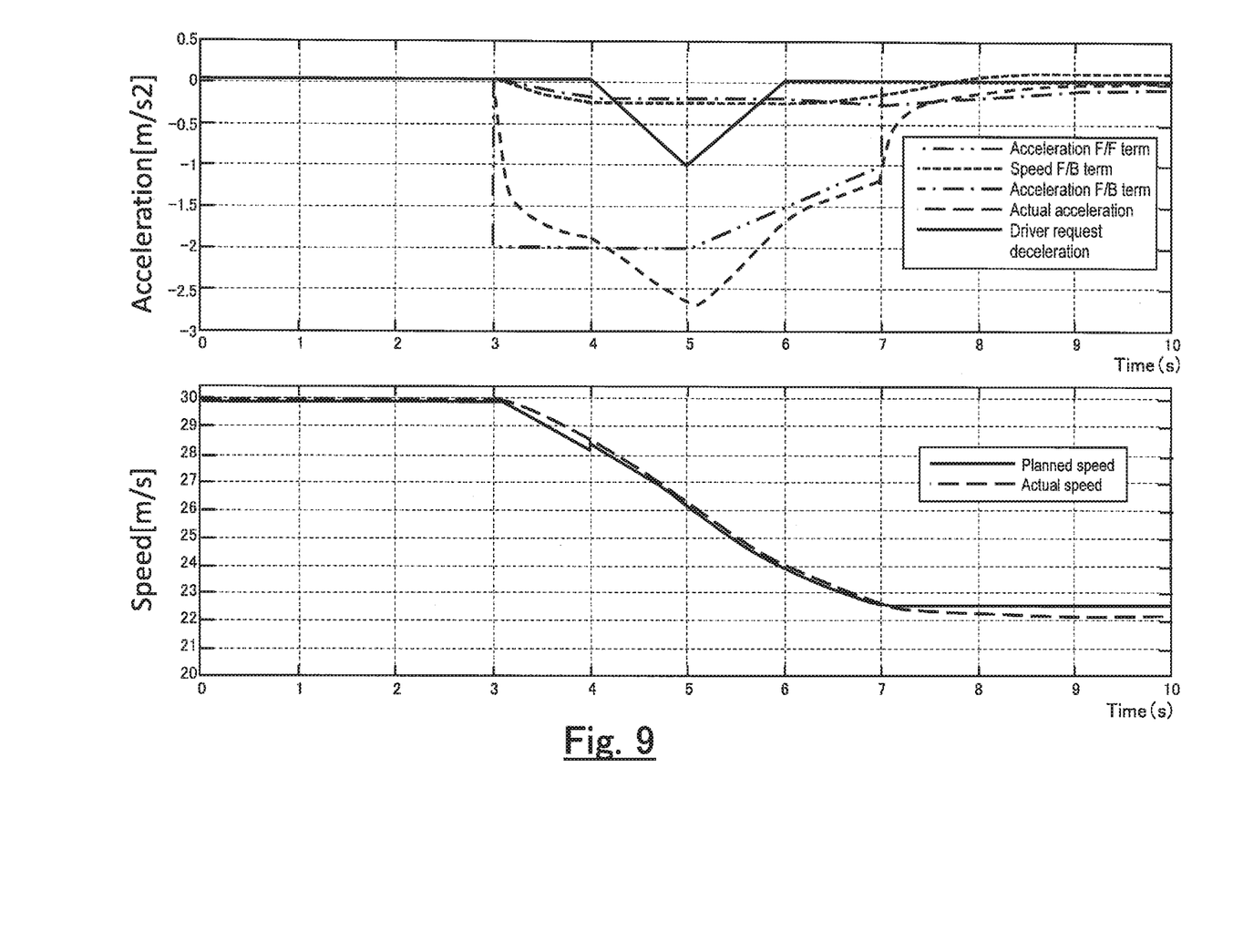
FIG. 9 is a diagram showing time-series data of braking assist control by the vehicle control apparatus according to the second embodiment of the present disclosure.

FIG. 9 is a diagram showing time-series data of the braking assist control by the vehicle control apparatus according to the present embodiment. This time-series data is that obtained when processing is executed in accordance with the control flow shown in FIG. 8. FIG. 9 shows time-series data concerning acceleration in the upper chart, and shows time-series data concerning speed in the lower chart. In the upper chart, the two-dot chain line shows the acceleration F/F term (planned acceleration), the dotted line shows the speed F/B term, the one-dot chain line shows the acceleration F/B term, the broken line shows the actual acceleration, and the solid line shows the driver request deceleration. In the lower chart, the solid line shows the planned speed, and the broken line shows the actual speed.

In FIG. 9, the braking assist control is started from the time 3 seconds. At the start of the braking assist control, the acceleration F/F term is output with a step signal. Then, after the start of the braking assist control, braking by the driver is started from the time 4 seconds. The driver request deceleration output with the start of braking by the driver changes from the zero level to the minus side from the time 4 seconds to the time 5 seconds, and changes to the plus side from the time 5 seconds to the time 6 seconds to return to the zero level. Consequently, the driver request deceleration is in the increasing trend from the time 4 seconds to the time 5 seconds, and decreases from the time 5 seconds to the time 6 seconds.

When the driver request deceleration changes as above, the acceleration F/F term is suppressed from changing to the plus side while the driver request deceleration is in the increasing trend. However, after the driver request deceleration turns to decrease, the acceleration F/F term changes to the plus side in accordance with the decreasing degree of the driver request deceleration. This is because the processing in step S510 in the control flow shown in FIG. 8 is executed.

Also, according to the vehicle control apparatus according to the present embodiment, while the driver request deceleration is output, the value of the speed F/B is held at the value at the time point when the signal of the driver request deceleration rose to the minus side even if the driver request deceleration is decreasing. This is because the processing in step S600 in the control flow shown in FIG. 8 is executed. Further, while the driver request deceleration is output, the acceleration F/B term doesn't change to the plus side even if the driver request deceleration is decreasing. This is because the processing in step S700 in the control flow shown in FIG. 8 is executed.

By changing the acceleration F/F term while holding the speed F/B term and the acceleration F/B term, the ADS request deceleration decreases in accordance with the decreasing degree of the driver request deceleration without being interfered by the speed F/B term and the acceleration F/B term. By decreasing the ADS request deceleration, the actual acceleration changes to the plus side following the decrease of the driver request deceleration as indicated by the broken line in the upper chart of FIG. 9. As this, according to the vehicle control apparatus according to the present embodiment, when the driver intends to decrease the vehicle deceleration, the driver's intention is reflected accurately to the vehicle deceleration via the ADS request deceleration calculated by the ADS-ECU 10.

Figure 10:
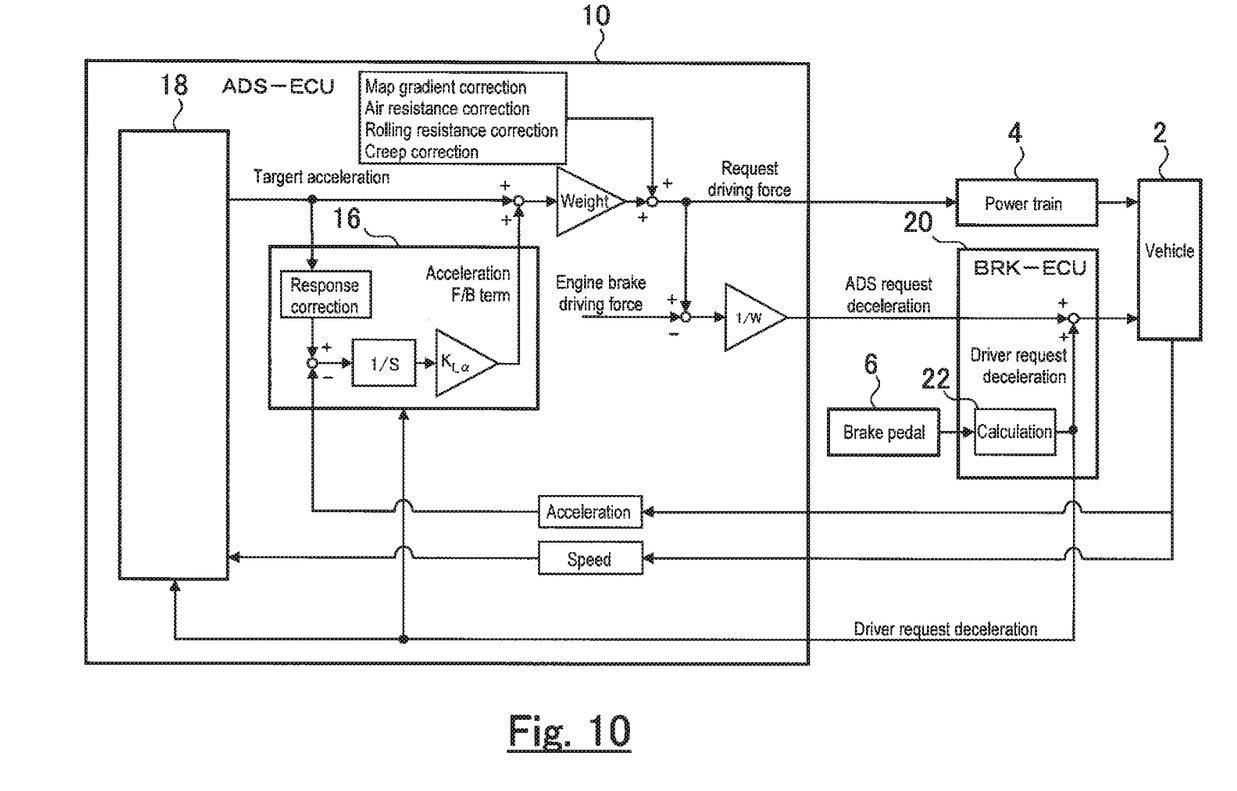
FIG. 10 is a control block diagram of a vehicle control apparatus according to a third embodiment of the present disclosure.

3. Third Embodiment 3-1. Configuration of Vehicle Control Apparatus According to Third Embodiment FIG. 10 is a control block diagram of the vehicle control apparatus according to the present embodiment. The vehicle control apparatus according to the present embodiment differs from the vehicle control apparatus according to the first embodiment shown in FIG. 1 in the configuration inside the ADS-ECU 10. Although the ADS-ECU 10 in the vehicle control apparatus according to the first embodiment comprises the planner 12 and the speed F/B term arithmetic unit separately, they are consolidated into a planner 18 in the vehicle control apparatus according to the present embodiment.

The planner 18 calculates the target acceleration for the purpose of keeping the distance between the vehicle 2 and a preceding vehicle, adjusting the speed of the vehicle 2 so as not to exceed a set speed, and adjusting the speed of the vehicle 2 so as to keep the lateral acceleration of the vehicle 2 below a specified value. However, when the deceleration request from the driver is obtained during the execution of the braking assist control by the ADS-ECU 10, the planner 18 permits only updating of the target acceleration to the side that increases the vehicle deceleration while the driver request deceleration is constant or in the increasing trend.

This processing corresponds to the "first arithmetic processing" defined in the claims. By updating the target acceleration only to the side that increases the vehicle deceleration, the ADS request deceleration calculated based on the target acceleration is suppressed from changing to the decreasing side. This makes it possible to obtain the vehicle deceleration to which the driver request deceleration is reflected, and thereby the driver can get deceleration feeling as expected.

Also, when the driver request deceleration decreases during the execution of the braking assist control, the planner 18 changes the target acceleration to the side that decreases the ADS request deceleration in accordance with the decreasing degree of the driver request deceleration. This processing corresponds to the "second arithmetic processing" defined in the claims. When the driver request deceleration decreases, by decreasing the ADS request deceleration in accordance with the decreasing degree thereof too, the driver can get deceleration feeling as expected when the driver intends to decrease the vehicle deceleration.

What is claimed is:

1. A vehicle control apparatus that executes braking assist control to decelerate a vehicle by automatic operation of a braking device, wherein
when the vehicle control apparatus obtains a deceleration request from a driver during execution of the braking assist control, while a driver request deceleration requested to the braking device by the driver is constant or in an increasing trend, the vehicle control apparatus executes first arithmetic processing to suppress a system request deceleration requested to the braking device by the braking assist control from being decreased by the braking assist control.

2. The vehicle control apparatus according to claim 1, wherein, in the braking assist control, the vehicle control apparatus calculates the system request deceleration based on a target acceleration, and
wherein, in the first arithmetic processing, when updating the target acceleration, the vehicle control apparatus permits only updating to a side that increases a vehicle deceleration.

3. The vehicle control apparatus according to claim 2, wherein, in the braking assist control, the vehicle control apparatus determines the target acceleration from an acceleration feedforward term that is a planned acceleration and a speed feedback term calculated based on a difference between a planned speed and an actual speed to calculate the system request deceleration based on the target acceleration, and
wherein, in the first arithmetic processing, when updating the acceleration feedforward term, the vehicle control apparatus permits only updating to a side that increases the vehicle deceleration.

4. The vehicle control apparatus according to claim 2, wherein, in the braking assist control, the vehicle control apparatus determines the target acceleration from an acceleration feedforward term that is a planned acceleration and a speed feedback term calculated based on a difference between a planned speed and an actual speed to calculate the system request deceleration based on the target acceleration, and
wherein, in the first arithmetic processing, the vehicle control apparatus holds a value of the speed feedback term.

5. The vehicle control apparatus according to claim 4, wherein, in the first arithmetic processing, the vehicle control apparatus updates the planned speed so as to make the planned speed coincide with the actual speed.

6. The vehicle control apparatus according to claim 1,
wherein, in the braking assist control, the vehicle control apparatus calculates an acceleration feedback term from a difference between a target acceleration and an actual acceleration by using integral control, and calculates the system request deceleration based on an acceleration obtained by summing the target acceleration and the acceleration feedback term, and wherein, in the first arithmetic processing, the vehicle control apparatus updates the acceleration feedback term if the acceleration feedback term is updated to a side that increases a vehicle deceleration, and holds a previous value of the acceleration feedback term without updating the acceleration feedback term if the acceleration feedback term isn't updated to the side that increases the vehicle deceleration.

7. The vehicle control apparatus according to claim 1,
wherein, when the driver request deceleration decreases during the execution of the braking assist control, the vehicle control apparatus executes second arithmetic processing to decrease the system request deceleration in accordance with a decreasing degree of the driver request deceleration.

8. The vehicle control apparatus according to claim 7,
wherein, in the braking assist control, the vehicle control apparatus calculates the system request deceleration based on a target acceleration, and wherein, in the second arithmetic processing, the vehicle control apparatus changes the target acceleration to a side that decreases the system request deceleration in accordance with the decreasing degree of the driver request deceleration.

9. The vehicle control apparatus according to claim 8,
wherein, in the braking assist control, the vehicle control apparatus determines the target acceleration from an acceleration feedforward term that is a planned acceleration and a speed feedback term calculated based on a difference between a planned speed and an actual speed to calculate the system request deceleration based on the target acceleration, and wherein, in the second arithmetic processing, the vehicle control apparatus changes the acceleration feedforward term to a side that decreases the system request deceleration in accordance with the decreasing degree of the driver request deceleration while holding a value of the speed feedback term.

* * * * *